United States Patent [19]

Sawa et al.

[11] Patent Number: 5,801,509
[45] Date of Patent: Sep. 1, 1998

[54] METHOD OF STARTING A PERMANENT-MAGNET SYNCHRONOUS MOTOR EQUIPPED WITH ANGULAR POSITION DETECTOR AND APPARATUS FOR CONTROLLING SUCH MOTOR

[75] Inventors: Toshihiro Sawa; Sumitoshi Sonoda; Syuuichi Fujii; Eiji Yamamoto, all of Fukuoka, Japan

[73] Assignee: Kabushiki Kaisha Yaskawa Denki, Kitakyushu, Japan

[21] Appl. No.: 714,078

[22] PCT Filed: Jan. 26, 1996

[86] PCT No.: PCT/JP96/00144

§ 371 Date: Sep. 27, 1996

§ 102(e) Date: Sep. 27, 1996

[87] PCT Pub. No.: WO96/23348

PCT Pub. Date: Aug. 1, 1996

[30] Foreign Application Priority Data

Jan. 27, 1995 [JP] Japan ................. 7-011322

[51] Int. Cl.⁶ ............................................. H02P 1/46
[52] U.S. Cl. ............................... 318/705; 318/603
[58] Field of Search ......................... 318/700–724, 318/661, 729, 652–660, 600–605

[56] References Cited

U.S. PATENT DOCUMENTS

| | | | |
|---|---|---|---|
| 4,027,213 | 5/1977 | de Valroger | 318/138 |
| 4,868,479 | 9/1989 | Byong-Ho et al. | 318/721 |
| 4,901,001 | 2/1990 | Saito et al. | 318/779 |
| 5,241,256 | 8/1993 | Hatanaka et al. | 318/801 |
| 5,410,234 | 4/1995 | Shibata et al. | 318/700 |
| 5,410,240 | 4/1995 | Runggaldier et al. | 323/237 |
| 5,428,283 | 6/1995 | Kalman et al. | 318/729 |
| 5,442,271 | 8/1995 | Hatanaka et al. | 318/729 |
| 5,471,127 | 11/1995 | Vaughan et al. | 318/809 |
| 5,530,331 | 6/1996 | Hanei | 318/592 |
| 5,537,020 | 7/1996 | Couture et al. | 318/720 |
| 5,635,810 | 6/1997 | Goel | 318/719 |

*Primary Examiner*—Brian Sircus
*Attorney, Agent, or Firm*—Oblon, Spivak, McClelland, Maier & Neustadt, P.C.

[57] ABSTRACT

An angular position detector for generating trains of A- and B-phase pulses which are 90° out of phase with each other and a C-phase pulse per rotation are mounted on a permanent-magnet synchronous motor such that a magnetic pole origin of permanent magnets and a position where the C-phase pulse is generated agree with each other. After a power supply voltage is applied and in an initial stage before the permanent-magnet synchronous motor is operated normally, a motor control apparatus operates a current control loop with an alternating current command having a constant amplitude and a low frequency to supply an alternating current having a low frequency to the permanent-magnet synchronous motor for thereby rotating the rotor of the permanent-magnet synchronous motor from a stop at a low speed. The motor control apparatus then detects arrival at a magnetic pole reference when a C-phase pulse is detected, and detects an angular displacement of the magnetic poles of the rotor using counts of the A- and B-phase pulses counted in synchronism with the rotation of the rotor after the C-phase pulse is detected.

6 Claims, 6 Drawing Sheets

METHOD OF STARTING A PERMANENT-MAGNET SYNCHRONOUS MOTOR EQUIPPED WITH ANGULAR POSITION DETECTOR AND APPARATUS FOR CONTROLLING SUCH MOTOR

TECHNICAL FIELD

The present invention relates to a method of starting a permanent-magnet synchronous motor equipped with an angular displacement detector, which comprises a rotor having permanent magnets as magnetic poles for driving the rotor, and an angular position detector mounted on a rotatable shaft of the permanent-magnet synchronous motor and having an A- and B-phase pulse train generating means for generating a number of A- and B-phase pulses per rotation which have respective electrical angles that are 90° out of phase with each other and a C-phase pulse train generating means for generating a C-phase pulse per rotation.

BACKGROUND ART

Heretofore, permanent-magnet synchronous motors for use as AC servomotors rotate a rotor by supplying a stator winding with a drive current which has a certain phase relationship to magnetic fluxes produced by permanent magnets mounted on the rotor depending on their position. Before the rotor is rotated, it is necessary to detect the position of the permanent magnets. To meet this requirement, a magnetic pole detector and an encoder which serves as an angular position detector are mounted on the permanent-magnet synchronous motors.

FIG. 1 is an elevational view of a permanent-magnet synchronous motor having an encoder and a magnetic position detector, and FIG. 2 is a block diagram of a motor control apparatus for controlling the permanent-magnet synchronous motor.

An encoder (angular position detector) 300 and a magnetic pole detector 400 are mounted on a permanent-magnet synchronous motor 200. The encoder 300, the magnetic pole detector 400, the permanent-magnet synchronous motor 200, and a motor control apparatus 100A jointly make up a permanent-magnet synchronous motor system. The encoder 300 is attached to the rotatable shaft of the permanent-magnet synchronous motor 200 and generates A- and B-phase pulses per rotation that are 90° out of phase with each other and a C-phase pulse per rotation.

The motor control apparatus 100A comprises a main circuit 110 and a control circuit 120A.

The main circuit 110 comprises a converter 111 for converting an alternating current into a direct current and outputting the direct current, a smoothing capacitor 112 for smoothing the direct current outputted from the converter 111, and an inverter 113 for energizing the permanent-magnet synchronous motor 200 based on a control signal from the control circuit 120A.

The control circuit 120A comprises a speed detector 121 for converting a signal from the encoder 300 into a speed signal, a speed controller 122 for controlling the speed of rotation of the permanent-magnet synchronous motor 200 based on an output signal SR from the speed detector 121 and a speed command SS, an angular signal detector 123A for detecting the signals from the encoder 300 and the magnetic pole detector 400 to generate an angular signal for a current command, a current command generator 124 for generating a current command from an output signal from the speed controller 122 and an output signal from the angular signal detector 123A, a current detector 125, and a current controller 126 for controlling a current of the inverter 113 based on the current command and a detected signal from the current detector 125.

If the permanent-magnet synchronous motor is incorporated in a spindle drive unit of a machine tool or an electric vehicle, it is necessary to reduce the size of the angular position detector due to limitations imposed on the location where the motor is installed. However, the conventional system requires two position detecting means, i.e., the encoder and the magnetic pole detector, and many signal lines to interconnect the inverter and the encoder and also the inverter and magnetic pole detector, resulting in a complex arrangement.

Attempts have been made to dispense with the magnetic pole detector. Japanese Patent Laid-open No. 197586/1994 discloses a motor control apparatus from which a magnetic pole detector is omitted. However, since the difference between the origin of the encoder and the magnetic pole reference of the rotor has to be measured and stored in a memory, the disclosed motor control apparatus has its cost increased by the measurement of the difference and the memory. Furthermore, the above publication does not show any specific details about the need for rotating the rotor in some way until the encoder origin is reached after the motor control apparatus has been switched on.

DISCLOSURE OF THE INVENTION

It is an object of the present invention to provide a method of starting a permanent-magnet synchronous motor and an apparatus for controlling a permanent-magnet synchronous motor with smaller and simpler detectors for the permanent-magnet synchronous motor and a reduced number of signal lines, without the need for measuring the difference between the origin of an encoder and the magnetic pole reference of a rotor in order to detect magnetic poles, and also without the need for storing in a memory an angular difference between the magnetic pole reference and the origin of an angular position detector for individual motors, to rotate the rotor without a magnetic pole detector.

According to the present invention, a method of starting a permanent-magnet synchronous motor in a permanent-magnet synchronous motor system which includes the permanent-magnet synchronous motor which has a rotor having permanent magnets as magnetic poles for driving the rotor, and an angular position detector mounted on a rotatable shaft of the permanent-magnet synchronous motor and having an A- and B-phase pulse train generating means for generating a number of A- and B-phase pulses per rotation which have respective electrical angles that are 90° out of phase with each other and a C-phase pulse train generating means for generating a C-phase pulse per rotation, and a motor control apparatus having a speed control loop and a current control loop for energizing the permanent-magnet synchronous motor, comprises the steps of:

installing said angular position detector having said C-phase pulse train generating means such that a magnetic pole reference of the permanent magnets of the rotor and a position where the C-phase pulse is generated agree with each other;

after a power supply voltage is applied and in an initial stage before the permanent-magnet synchronous motor is operated normally, operating said current control loop with an alternating current command having a constant amplitude and a low frequency to supply an alternating current having a low frequency to the permanent-magnet synchronous motor for thereby rotating the rotor of the permanent-magnet synchronous motor from a stop at a low speed; and detecting arrival at the magnetic pole reference when a C-phase pulse is detected, and detecting an angular displacement of the magnetic poles of the rotor using counts of the A- and B-phase pulses counted in synchronism with the rotation of the rotor after the C-phase pulse is detected.

Since the angular displacement detector is installed on the permanent-magnet synchronous motor such that the C-phase pulse train generating means outputs a C-phase pulse when the preset magnetic pole reference of the rotor reaches a predetermined angle of the stator, it is not necessary to measure the difference between the origin of the angular displacement detector and the magnetic pole reference of the rotor after assembly. Based on the current command generated by the motor control apparatus, the permanentmagnet synchronous motor equipped with the angular displacement detector is rotated, and the permanent-magnet synchronous motor is controlled based on a correct magnetic pole reference after a C-phase pulse is detected. Therefore, since a difference memory for the C-phase pulse magnetic pole reference and a magnetic pole detector are not required, the cost is reduced because of the absence of such a difference memory and a magnetic pole detector.

Preferably, the rotor starts being rotated in the initial stage in response to either the application of an alternating current power supply or an external command signal. Furthermore, the rotor preferably starts being rotated in the initial stage in one direction or reversibly in opposite directions, said C-phase pulse being detected a plurality of times, whereby the accuracy of detection of the position of the origin for the detection of the position of the magnetic poles can be increased, or a C-phase pulse is preferably detected for detecting the position of the magnetic pole reference thereby to correct the angular displacement of the magnetic poles of the rotor, even during normal rotation of the rotor after the position of the origin is detected.

According to the present invention, another method of starting a permanent-magnet synchronous motor in a permanent-magnet synchronous motor system which includes the permanent-magnet synchronous motor which has a rotor having permanent magnets as magnetic poles for driving the rotor, and an angular position detector mounted on a rotatable shaft of the permanent-magnet synchronous motor and having an A- and B-phase pulse train generating means for generating a number of A- and B-phase pulses per rotation which have respective electrical angles that are 90° out of phase with each other and a C-phase pulse train generating means for generating a C-phase pulse per rotation, and a motor control apparatus having a speed control loop and a current control loop for energizing the permanent-magnet synchronous motor, comprises the steps of:

installing said angular position detector having said C-phase pulse train generating means such that a magnetic pole reference of the permanent magnets of the rotor and a position where the C-phase pulse is generated agree with each other;

when a power supply voltage is applied and in an initial stage before the permanent-magnet synchronous motor is operated normally, for starting to operate the permanent-magnet synchronous motor, supplying an angular displacement signal for a current command to the current command loop at a predetermined angle in each preset unit time, operating the speed control loop with a speed signal, which represents an angle change in said each preset unit time, as a command for a speed controller, for thereby controlling an amplitude of said current command, causing said motor control apparatus to supply an alternating current having a low frequency to the permanent-magnet synchronous motor for thereby rotating the rotor of the permanent-magnet synchronous motor from a stop at a low speed; and detecting arrival at the magnetic pole reference when a C-phase pulse is detected, switching the angular displacement signal for the current command to an angular displacement signal for a current command which is produced using counts of the A- and B-phase pulses counted in synchronism with the rotation of the rotor with the position of the C-phase pulse being used as an origin, and switching the command for the speed controller to a predetermined speed command for thereby operating the permanent-magnet synchronous motor.

Preferably, the rotor starts being rotated in the initial stage in response to either the application of an alternating current power supply or an external command signal.

Even if the position of the magnetic poles is not detected, the motor is rotated in an open loop, and a C-phase pulse of the angular displacement detector is detected to determine the magnetic pole reference. Therefore, it is possible to start the motor stably without a magnetic pole detector.

A direct current may be supplied for a given period of time at an optional angle at the time of starting to detect the magnetic pole reference, thereafter an alternating current having a low frequency may be supplied to the permanent-magnet synchronous motor based on an angular displacement signal after an angle signal is generated in the permanent-magnet synchronous motor, and the permanent-magnet synchronous motor may be stably rotated until a C-phase pulse from the angular displacement detector is detected.

According to the present invention, an apparatus having a speed control loop and a current control loop, for controlling a permanent-magnet synchronous motor having a rotor having permanent magnets as magnetic poles for driving the rotor, and an angular position detector mounted on a rotatable shaft of the permanent-magnet synchronous motor and having an A- and B-phase pulse train generating means for generating a number of A- and B-phase pulses per rotation which have respective electrical angles that are 90° out of phase with each other and a C-phase pulse train generating means for generating a C-phase pulse per rotation, the angular position detector being assembled so as to output a C-phase pulse when a magnetic pole reference of the rotor reaches a predetermined angle of a stator, comprises:

a main circuit and a control circuit;

said main circuit comprising a converter for converting an alternating current into a direct current and outputting the direct current, a smoothing capacitor for smoothing the direct current outputted from the converter, and an inverter for energizing the permanent-magnet synchronous motor;

said control circuit comprising speed detecting means for converting a signal from said angular position detector into a speed signal and outputting the speed signal, speed control means for controlling a speed of the permanent-magnet synchronous motor with said speed signal and a speed command, angle signal detecting means for generating an angular displacement signal for a current command which is produced using counts of the A- and B-phase pulses counted in synchronism with the rotation of the rotor with the position of a C-phase pulse from the angular position detector being used as a magnetic pole reference of the rotor when the C-phase pulse is outputted, first current command generating means for generating a current command based on an output signal supplied from said speed control means and an output signal supplied from said angle signal detecting means, detecting an angular displacement of the magnetic poles of the rotor of the permanent-magnet synchronous motor using counts of the A- and B-phase pulses subsequently counted in synchronism with the rotation of the rotor when a C-phase pulse is thereafter detected during rotation of the permanent-magnet synchronous motor, and thereafter outputting a magnetic pole reference detection completion signal, second current command generating means for outputting an alternating current command having a constant amplitude and a low frequency, current command switch means for switching between outputting the current command outputted from the first current command generating means and outputting the current command outputted from the second current command generating means, magnetic pole detection command generating means for starting said second current command generating means and switching said current command switch means to said second current command generating means in an initial stage before a normal operation command is given to the permanent-magnet synchronous motor after a power supply voltage is applied to the permanent-magnet synchronous motor, and switching said current command switch means to said first current command generating means when said magnetic pole reference detection completion signal is outputted, current detecting means for detecting a current outputted from said inverter to the permanent-magnet synchronous motor, and current control means for controlling a current of said inverter with the current command supplied from said current command switch means and a detected signal from said current detecting means.

According to the present invention, another apparatus having a speed control loop and a current control loop, for controlling a permanent-magnet synchronous motor having a rotor having permanent magnets as magnetic poles for driving the rotor, and an angular position detector mounted on a rotatable shaft of the permanent-magnet synchronous motor and having an A- and B-phase pulse train generating means for generating a number of A- and B-phase pulses per rotation which have respective electrical angles that are 90° out of phase with each other and a C-phase pulse train generating means for generating a C-phase pulse per rotation, the angular position detector being assembled so as to output a C-phase pulse when a magnetic pole reference of the rotor reaches a predetermined angle of a stator, comprises:

a main circuit and a control circuit;

said main circuit comprising a converter for converting an alternating current into a direct current and outputting the direct current, a smoothing capacitor for smoothing the direct current outputted from the converter, and an inverter for energizing the permanent-magnet synchronous motor;

said control circuit comprising speed detecting means for converting a signal from said angular position detector into a speed signal and outputting the speed signal, speed control means for controlling a speed of the permanentmagnet synchronous motor with said speed signal and a speed command, angle signal detecting means for generating an angular displacement signal for a current command which is produced using counts of the A- and B-phase pulses counted in synchronism with the rotation of the rotor with the position of a C-phase pulse from the angular position detector being used as a magnetic pole reference of the rotor when the C-phase pulse is outputted, angle command generating means for generating an angular displacement signal at a low frequency and a speed signal representing an angle change in each preset unit time of the angular displacement signal, angle command switch means for switching between outputting the angular displacement signal outputted from said angle signal detecting means and outputting the angular displacement signal outputted from said angle command generating means, speed command switch means for switching between outputting a speed command supplied to said apparatus and outputting a speed command outputted from said angle command generating means, magnetic pole reference detecting means for outputting a magnetic pole reference detection completion signal and outputting a reset signal to reset the angular displacement signal to zero to said angle signal detecting means when a C-phase pulse from said angular position detector is detected, magnetic pole detection command generating means for switching said angle command switch means and said speed command switch means to said angle command generating means in an initial stage before a normal operation command is given to the permanent-magnet synchronous motor after a power supply voltage is applied to the permanent-magnet synchronous motor, and switching said angle command switch means and said speed command switch means to said angle signal detecting means and the speed command supplied to the apparatus, respectively, when said magnetic pole reference detection completion signal is outputted, current command generating means for generating a current command from a current amplitude signal supplied from said speed control means and the angular displacement signal supplied from said angle command switch means, current detecting means for detecting a current outputted from said inverter to the permanent-magnet synchronous motor, and current control means for controlling a current of said inverter with the current command supplied from said current command generating means and a detected signal from said current detecting means.

BEST MODE FOR CARRYING OUT THE INVENTION

A first embodiment of the present invention will be described below with reference to FIGS. 3 and 4.

Figure 3:
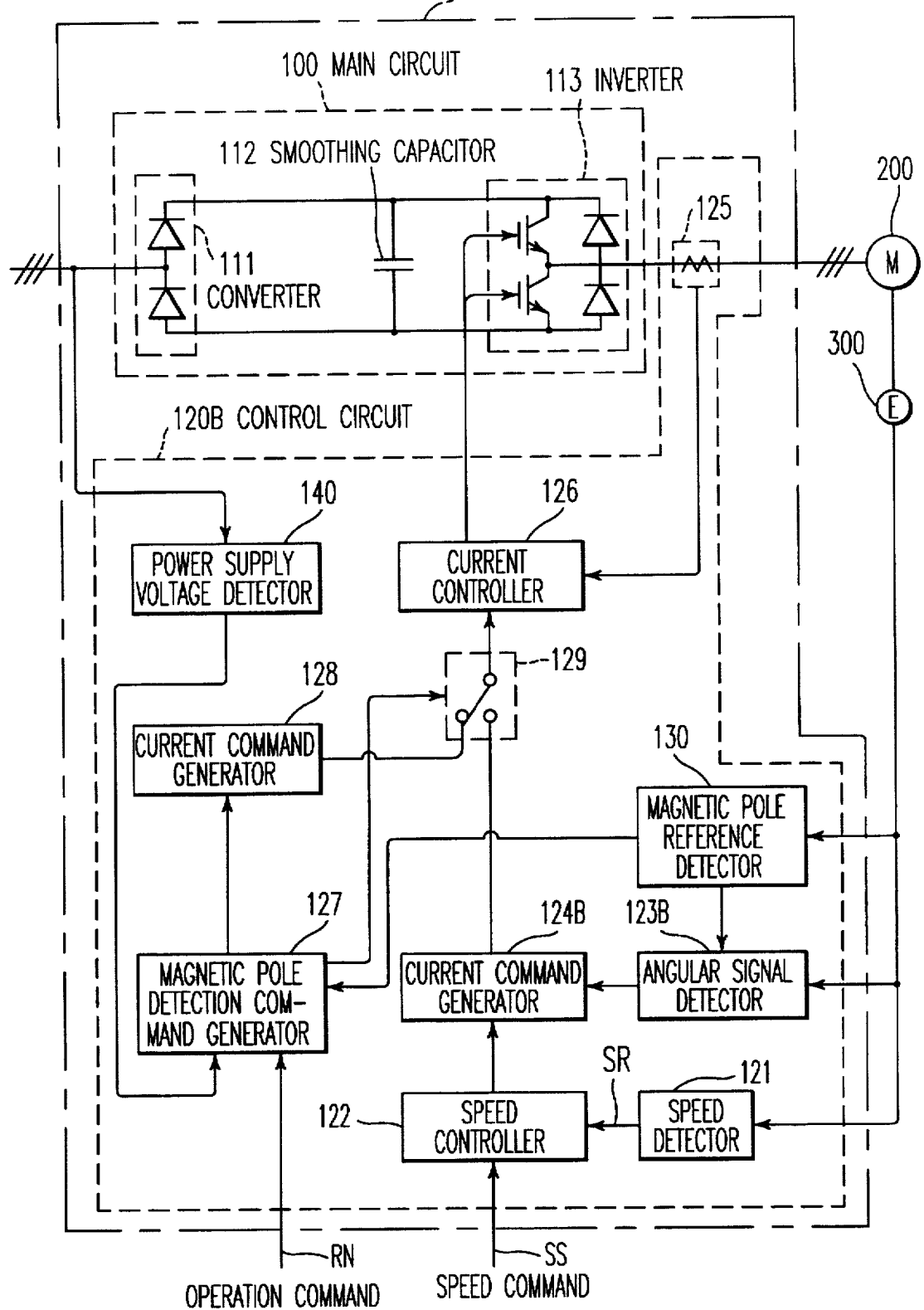
FIG. 3 is a block diagram of a permanent-magnet synchronous motor system according to a first embodiment of the present invention.
Figure 4:
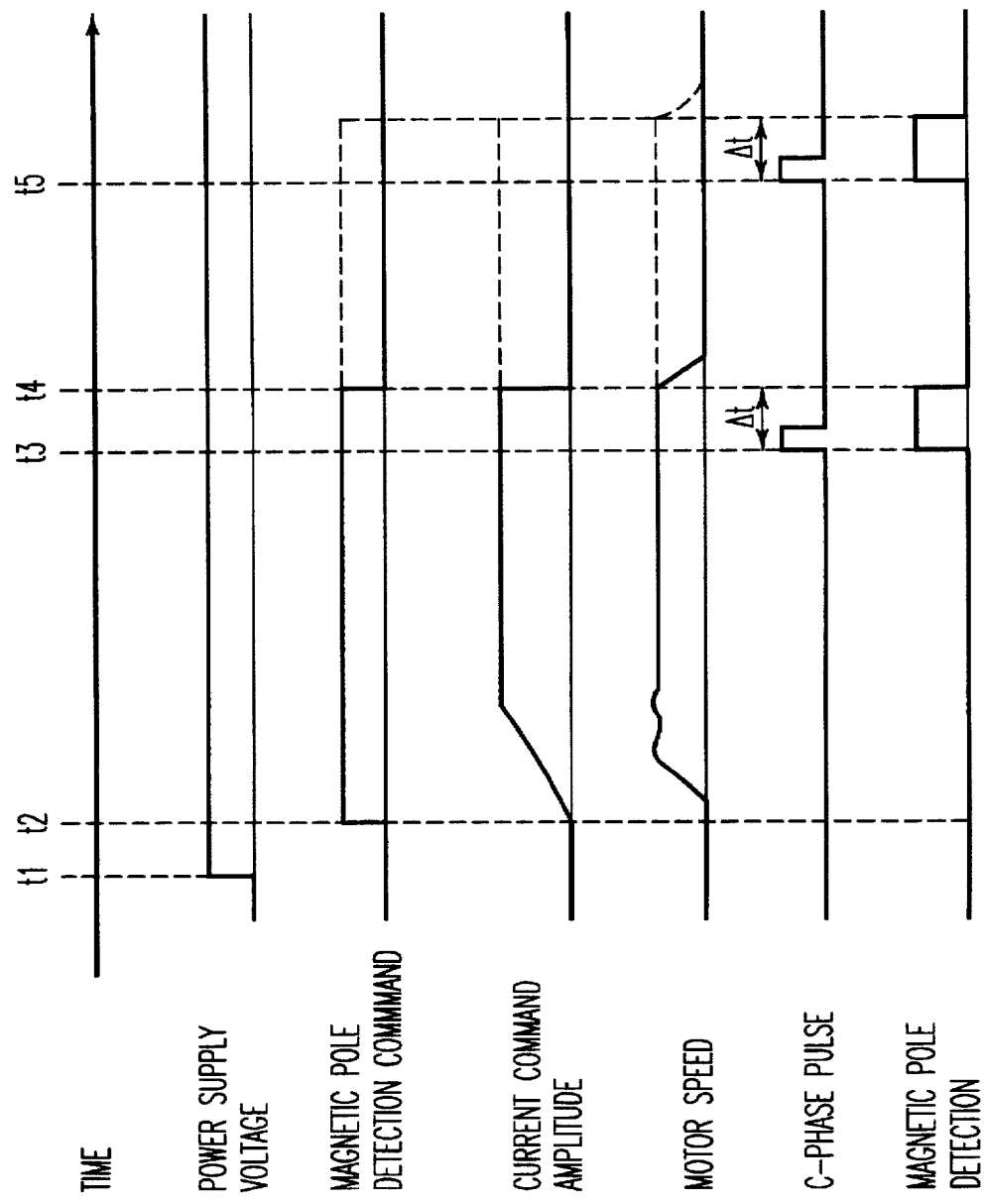
FIG. 4 is a timing chart showing operation of the permanent-magnet synchronous motor system according to the first embodiment.

As shown in FIG. 3, a permanent-magnet synchronous motor 200, an encoder 300, and a motor control apparatus 100B jointly make up a permanent-magnet synchronous motor system.

The motor control apparatus 100B comprises a main circuit 110 and a control circuit 120B for energizing the permanent-magnet synchronous motor 200. The encoder 300 generates A- and B-phase pulses that are 90° out of phase with each other and a C-phase pulse per rotation depending on the angular displacement of the permanent-magnet synchronous motor 200, as is conventional. The encoder 300 is assembled such that it outputs a C-phase pulse when the established magnetic pole reference of a rotor reaches a predetermined angle of a stator.

Figure 1:
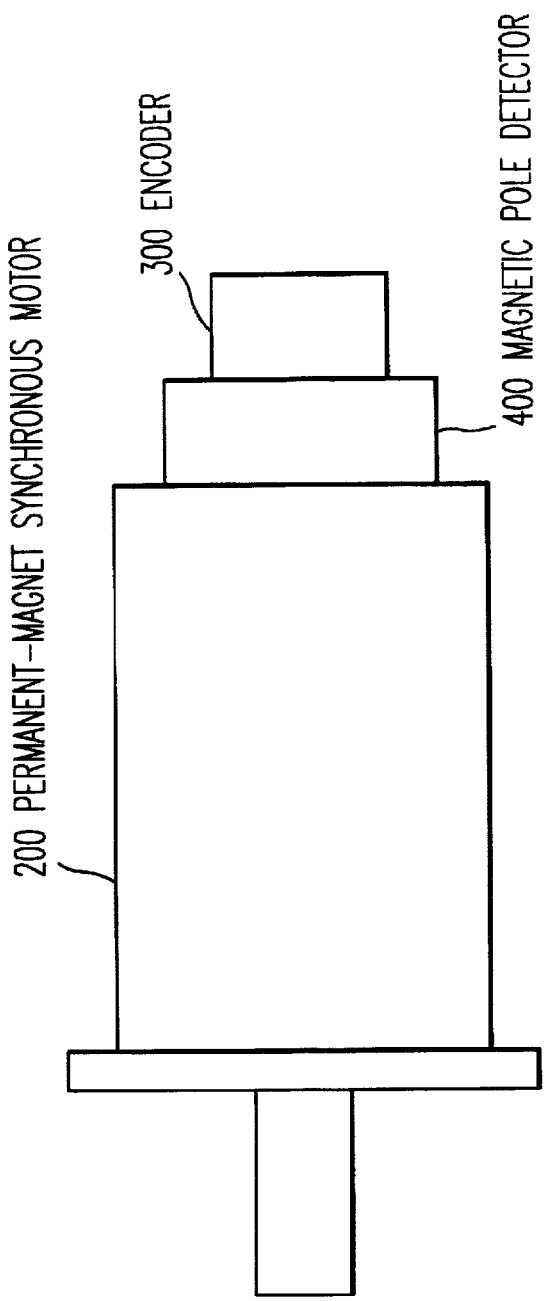
FIG. 1 is an elevational view of a permanent-magnet synchronous motor with an encoder and a magnetic pole detected mounted thereon.
Figure 2:
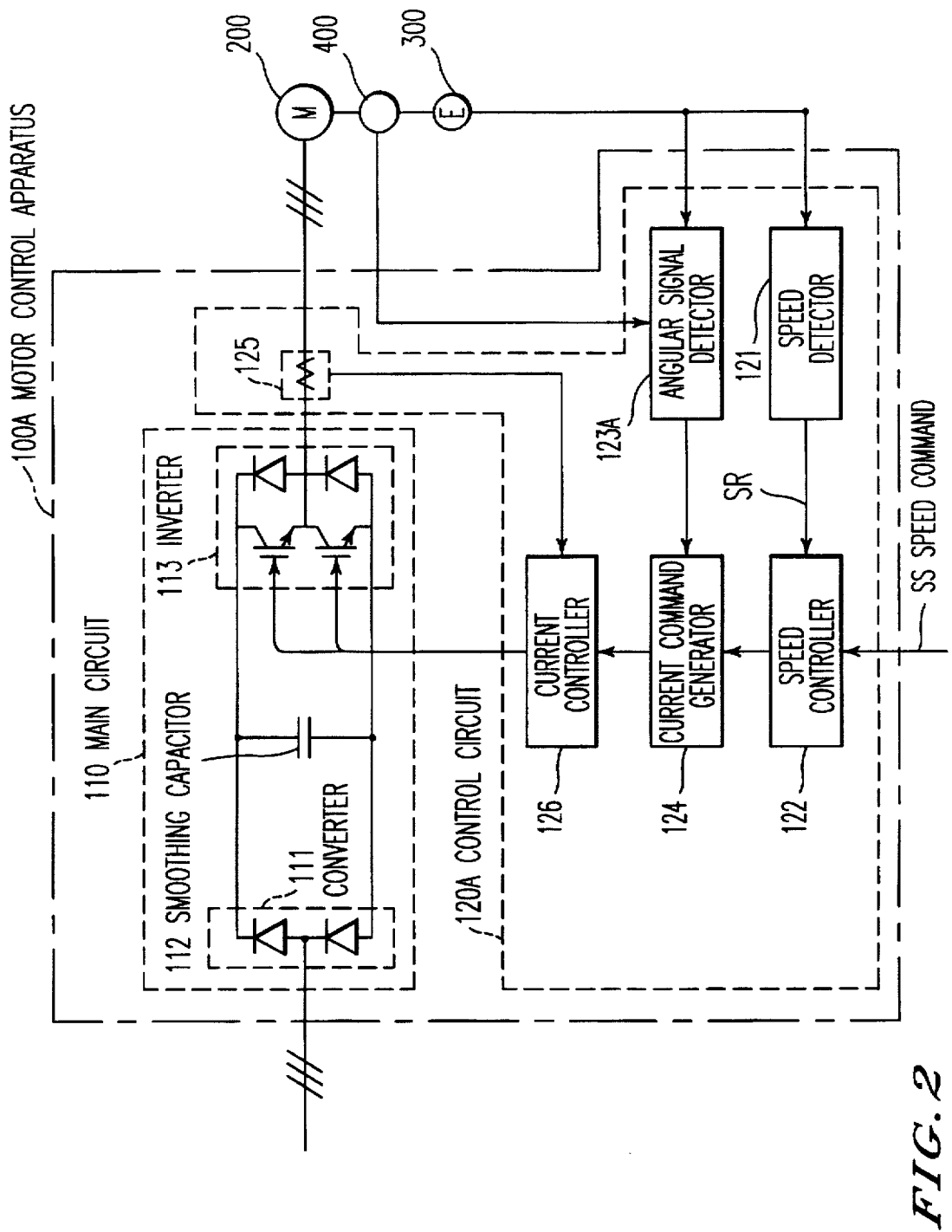
FIG. 2 is a block diagram of a conventional motor control apparatus for controlling the permanent-magnet synchronous motor.

The control circuit 120B of the motor control apparatus 100B is different from the control circuit 120A of the conventional motor control apparatus 100A shown in FIG. 2. Specifically, the control circuit 120B has an angular signal generator 123B, instead of the angular signal detector 123A, for generating an angular displacement signal for a current command produced using the counts of A- and B-phases counted in synchronism with the rotation of the rotor, when a C-phase pulse is outputted from the encoder 300, with the position of the C-phase pulse being used as a magnetic pole reference. The control circuit 120B further comprises a current command generator 128 for generating an alternating current command having a low frequency and a constant amplitude, a current command switch 129 for outputting either a current command signal from a current command generator 124B or a current command signal from a current command generating means 128, a power supply voltage detector 140 for detecting the application of a power supply voltage to the motor control apparatus 100B and outputting a voltage application signal, and a magnetic pole reference detection command generator 127 for receiving the voltage application signal from the power supply voltage detector 140 and an operation command in an initial stage before the permanent-magnet synchronous motor 200 begins to operate normally, starting to operate the current command generator 128 and switching the current command switch 129 to the current command generator 128 according to either one of the signals which is selected by a preset selection parameter, and switching the current command switch 129 to the current command generator 124B when supplied with a magnetic pole reference detection completion signal from the current command generator 124B. While the current command generator 128 generates a current command having a constant amplitude, it has a delay function to delay the current command to increase the amplitude of the current command up to the constant amplitude at a current amplitude increasing rate determined per unit time when the motor control apparatus starts being energized for detecting magnetic poles.

Operation of the first embodiment will be described below with reference to FIG. 4.

After the power supply voltage is applied to the motor control apparatus 100B at a time t1, the power supply voltage detector 140 detects the application of the power supply voltage to the motor control apparatus 100B and outputs a voltage application signal. In an initial stage before the permanent-magnet synchronous motor 200 begins to operate normally, the magnetic pole detection command generator 127 receives either the voltage application signal from the power supply voltage detector 140 or the operation command, which is selected according to a preset selection parameter, outputs a magnetic pole detection command at a time t2, and switches the current command switch 129 to the current command generator 128, entering a magnetic pole position detection mode. Therefore, the current command is isolated from a speed control loop including the current command generator 124, and the alternating current command, which has a low frequency and a constant amplitude, generated by the current command generator 128 is supplied to the current controller 126. The current controller 126 uses a current control loop up to the permanent-magnet synchronous motor 200 to control the inverter 113 to supply an alternating current having a low frequency to the permanent-magnet synchronous motor 200 for thereby rotating the permanent-magnet synchronous motor 200. If a magnetic pole reference detector 130 detects a C-phase pulse from the encoder 300 at a time t3 during the magnetic pole reference detection operation upon the rotation of the permanent-magnet synchronous motor 200, then the magnetic pole reference detector 130 sends a magnetic pole reference detection completion signal to the magnetic pole detection command generator 127. At the same time, the magnetic pole reference detector 130 sends a reset signal to reset the angular displacement signal to 0 to the angular signal generator 123B. When the magnetic pole detection command generator 127 receives the magnetic pole reference detection completion signal from the magnetic pole reference detector 130, the magnetic pole detection command generator 127 switches the current command switch 129 to the current command generator 124. The motor control apparatus 100B now switches from the magnetic pole reference detection mode to a normal speed control mode, operating the permanent-magnet synchronous motor 200 under normal speed control.

For increasing the accuracy of detection of the magnetic pole reference, it is effective to reverse the direction of rotation of the alternating current command of low frequency from the current command generator 128 or detect a plurality of C-phase pulses. Even while the motor control apparatus 100B is supplying an alternating current to energize the permanent-magnet synchronous motor 200, it is also effective to detect a C-phase pulse from the encoder 300 at a time t5 to correct the position of the magnetic pole reference for increasing the accuracy of detection of the magnetic pole reference.

A second embodiment of the present invention will be described below with reference to FIGS. 5 and 6.

Figure 5:
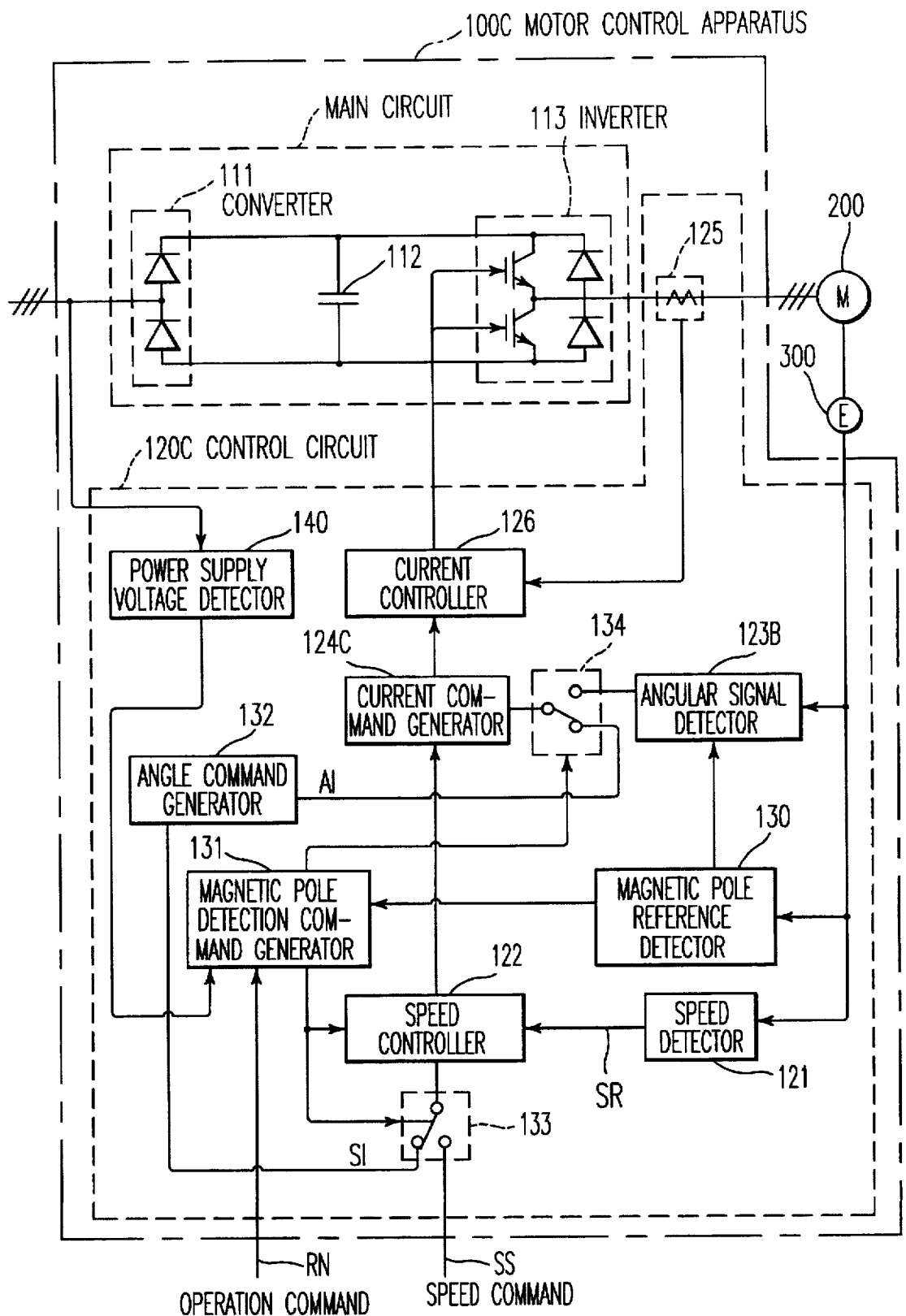
FIG. 5 is a block diagram of a permanent-magnet synchronous motor system according to a second embodiment of the present invention.

As shown in FIG. 5, a permanent-magnet synchronous motor 200, an encoder 300, and a motor control apparatus 100C jointly make up a permanent-magnet synchronous motor system.

The motor control apparatus 100C comprises a main circuit 110 and a control circuit 120C for energizing the permanent-magnet synchronous motor 200. The encoder 300 generates A- and B-phase pulses that are 90° out of phase with each other and a C-phase pulse per rotation depending on the angular displacement of the permanent-magnet synchronous motor 200, as is conventional. As with the first embodiment, the encoder 300 is assembled such that it outputs a C-phase signal when the established magnetic pole reference of a rotor reaches a predetermined angle of a stator.

The control circuit 120C of the motor control apparatus 100C is different from the control circuit 120A of the conventional motor control apparatus 100A shown in FIG. 2. Specifically, the control circuit 120C has an angular signal generator 123B, instead of the angular signal detector 123A, for generating an angular displacement signal for a current command produced using the counts of A- and B-phases counted in synchronism with the rotation of the rotor, when a C-phase pulse is outputted from the encoder 300, with the position of the C-phase pulse being used as a magnetic pole reference. The control circuit 120C further comprises a power supply voltage detector 140 for detecting the application of a power supply voltage to the motor control apparatus 100C and outputting a voltage application signal, a magnetic pole detection command generator 131 for receiving the voltage application signal from the power supply voltage detector 140 and an operation command in an initial stage before the permanent-magnet synchronous motor 200 begins to operate normally, and outputting a switching signal to switch between an angle command and a speed command according to either one of the signals which is selected by a preset selection parameter, an angle command generator 132 for generating an angular displacement signal AI having a low frequency and a speed signal SI representing an angle change per unit time of the angular displacement signal AI, an angle command switch 134 for switching between an angular displacement signal from an angle signal generator 123B and an angular displacement signal AI from the angle command generator 132 based on an output signal from the magnetic pole detection command generator 131, a speed command switch 133 for switching between a speed command SS and the speed signal SI based on the output signal from the magnetic pole detection command generator 131, and a magnetic pole origin detector 130 for detecting a C-phase pulse signal from the encoder 300.

Operation of the second embodiment will be described below with reference to FIG. 6.

After the power supply voltage is applied to the motor control apparatus 100C at a time t1, the power supply voltage detector 140 detects the application of the power supply voltage to the motor control apparatus 100C and outputs a voltage application signal. In an initial stage before the permanent-magnet synchronous motor 200 begins to operate normally, the magnetic pole detection command generator 131 receives either the voltage application signal from the power supply voltage detector 140 or the operation command, which is selected according to a preset selection parameter, outputs commands at a time t2 to the angle command switch 134 and the speed command switch 133. As a result, the angular displacement signal AI having a low frequency and the speed signal SI, which are generated by the angle command generator 132, are selected. The motor control apparatus 100C operates the speed controller 122 and the current controller 126 in synchronism with the output signal from the magnetic pole detection command generator 131. The current controller 126 supplies a drive signal to a power device such as an IGBT (Insulated Gate Bipolar Transistor) of the inverter 113, operating the inverter 113 for thereby supplying electric energy to the permanent-magnet synchronous motor 200.

Since the position of the magnetic pole reference of the rotor is not detected at the time of starting the permanent-magnet synchronous motor 200, the permanent-magnet synchronous motor 200 is started using the angular displacement signal AI having a low frequency and the speed signal SI, which are generated by the angle command generator 132. Specifically, a frequency component of the current command applied to a current command generator 124C is the angular displacement signal AI having a low frequency which is generated by the angle command generator 132, and an amplitude component of the current command is an output signal of the speed controller 122 that is supplied with the output signal SR from the speed detector 121 and the speed command SS. Based on an alternating current command having a low frequency which is generated by the current command generator 124C, the current controller 126 operates a current control loop for the inverter 113 to supply an alternating current having a low frequency to the permanent-magnet synchronous motor 200 to rotate the encoder 300.

If the magnetic pole reference detector 130 detects a C-phase pulse from the encoder 300 at a time t3 during the rotation of the permanent-magnet synchronous motor 200, then the magnetic pole reference detector 130 sends a magnetic pole reference detection completion signal to the magnetic pole detection command generator 131. At the same time, the magnetic pole reference detector 130 sends a reset signal to reset the angular displacement signal to 0 to the angular signal generator 123B. In response to the magnetic pole reference detection completion signal, the magnetic pole detection command generator 131 immediately outputs commands to the angle command switch 134 and the speed command switch 133 for thereby selecting the output signal from the angle signal detector 123B and the speed command SS. After the time t3, an angular displacement signal for a current command which is produced by the angle signal generator 123B using the counts of A- and B-phases counted in synchronism with the rotation of the rotor is used to switch the command of the speed controller 122 to the speed command SS, starting the permanent-magnet synchronous motor 200 in a speed control mode based on a magnetic pole detection signal.

Figure 6:
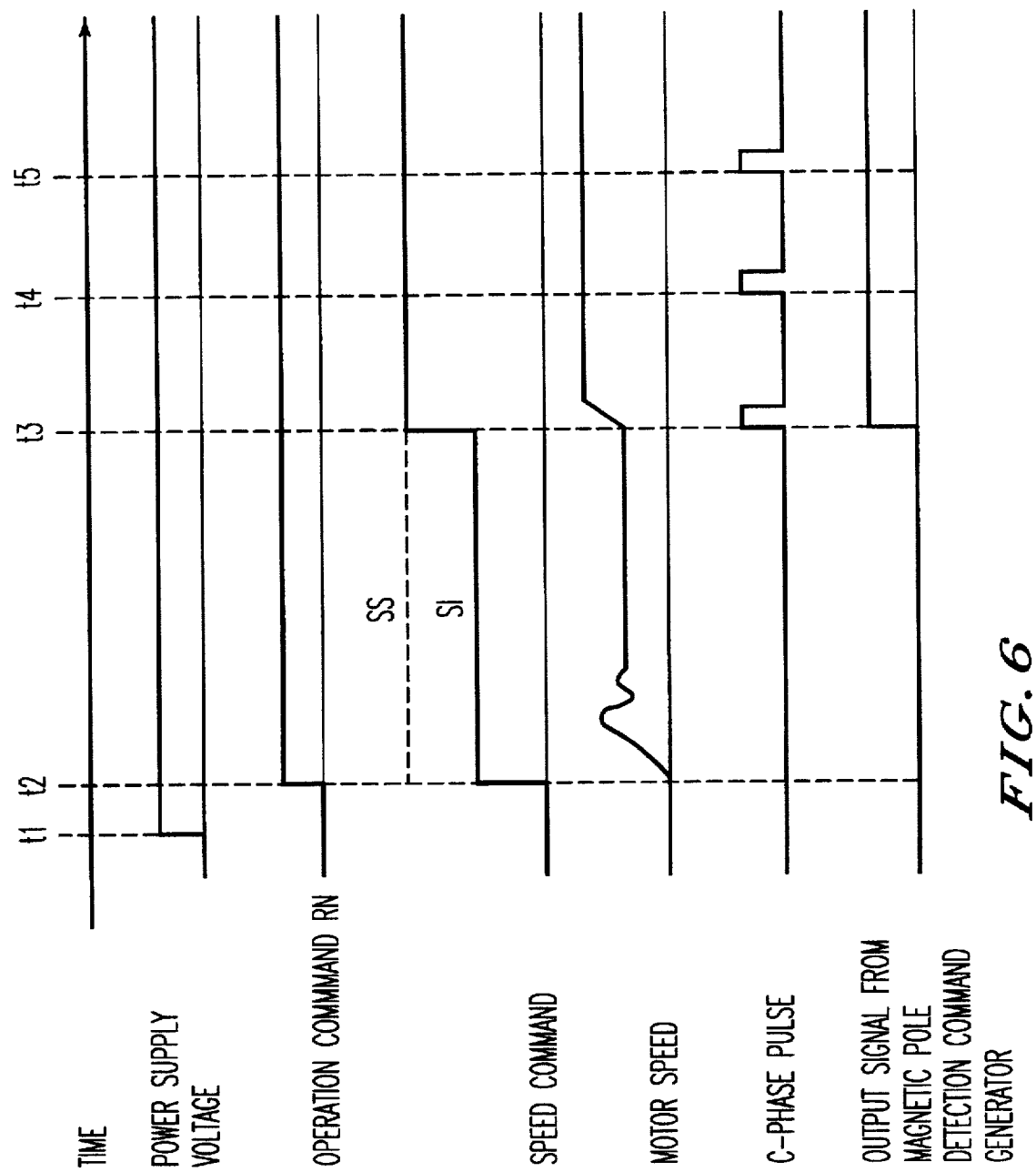
FIG. 6 is a timing chart showing operation of the permanent-magnet synchronous motor system according to the second embodiment.

For increasing the accuracy of detection of the magnetic pole reference, it is effective to supply a direct current at an optional angle for a certain period of time at the time of starting to operate the permanent-magnet synchronous motor 200, and thereafter to start the permanent-magnet synchronous motor 200 based on the angle signal from the angle command generator 132, or to detect a plurality of C-phase pulses at respective times t3, t4, t5 shown in FIG. 6. Even while the motor control apparatus 100C is supplying an alternating current to energize the permanent-magnet synchronous motor 200, it is also effective for the magnetic pole detector 130 to detect a C-phase pulse from the encoder 300 for detecting the magnetic pole reference to correct the position of the origin of the angle command applied to the angle signal detector 123B for increasing the accuracy of detection of the magnetic pole reference.

We claim:

1. A method of starting a permanent-magnet synchronous motor in a permanent-magnet synchronous motor system which includes the permanent-magnet synchronous motor which has a rotor having permanent magnets as magnetic poles for driving the rotor, and an angular position detector mounted on a rotatable shaft of the permanent-magnet synchronous motor and having an A- and B-phase pulse train generating means for generating a number of A- and B-phase pulses per rotation which have respective electrical angles that are 90° out of phase with each other and a C-phase pulse train generating means for generating a C-phase pulse per rotation, and a motor control apparatus having a speed control loop and a current control loop for energizing the permanent-magnet synchronous motor said angular position detector being installed such that a magnetic pole reference of the permanent magnets of the rotor and a position where the C-phase pulse is generated agree with each other, said method comprising the steps of:

when a power supply voltage is applied and in an initial stage before the permanent-magnet synchronous motor is operated normally, for starting to operate the permanent-magnet synchronous motor, supplying an angular displacement signal for a current command to the current command loop at a predetermined angle in each preset unit time, operating the speed control loop with a speed signal, which represents an angle change in said each preset unit time, as a command for a speed controller, for thereby controlling an amplitude of said current command, causing said motor control apparatus to supply an alternating current having a low frequency to the permanent-magnet synchronous motor for thereby rotating the rotor of the permanent-magnet synchronous motor from a stop at a low speed; and detecting arrival at the magnetic pole reference when a C-phase pulse is detected, switching the angular displacement signal for the current command to an angular displacement signal for the current command which is produced using counts of the A- and B-phase pulses counted in synchronism with the rotation of the rotor with the position of the C-phase pulse being used as an origin, and switching the command for the speed controller to a predetermined speed command for the speed control to a predetermined speed command for thereby operating the permanent-magnet synchronous motor.

2. A method according to claim 1, wherein said rotor starts being rotated in the initial stage in response to the application of an alternating current power supply.

3. A method according to claim 1, wherein said rotor starts being rotated in the initial stage in response to an external command signal.

4. A method according to claim 1, wherein a direct current is supplied for a given period of time at an optional angle at the time of starting to detect the magnetic pole reference, thereafter an alternating current having a low frequency is supplied to the permanent-magnet synchronous motor based on an angular displacement signal from an angle signal generator in the permanent-magnet synchronous motor, and the permanent-magnet synchronous motor is stably rotated until a C-phase pulse from the angular displacement detector is detected.

5. An apparatus having a speed control loop and a current control loop, for controlling a permanent-magnet synchronous motor having a rotor having permanent magnets as magnetic poles for driving the rotor, and an angular position detector mounted on a rotatable shaft of the permanent-magnet synchronous motor and having an A- and B-phase pulse train generating means for generating a number of A- and B-phase pulses per rotation which have respective electrical angles that are 90° out of phase with each other and a C-phase pulse train generating means for generating a C-phase pulse per rotation, the angular position detector being assembled so as to output a C-phase pulse when a magnetic pole reference of the rotor reaches a predetermined angle of a stator, said apparatus comprising:

a main circuit and a control circuit;

said main circuit comprising a converter for converting an alternating current into a direct current and outputting the direct current, a smoothing capacitor for smoothing the direct current outputted from the converter, and an inverter for energizing the permanent-magnet synchronous motor;

said control circuit comprising speed detecting means for converting a signal from said angular position detector into a speed signal and outputting the speed signal, speed control means for controlling a speed of the permanent-magnet synchronous motor with said speed signal and a speed command, angle signal detecting means for generating an angular displacement signal for a current command which is produced using counts of the A- and B-phase pulses counted in synchronism with the rotation of the rotor with the position of a C-phase pulse from the angular position detector being used as a magnetic pole reference of the rotor when the C-phase pulse is outputted, first current command generating means for generating a current command based on an output signal supplied from said speed control means and an output signal supplied from said angle signal detecting means, detecting an angular displacement of the magnetic poles of the rotor of the permanent-magnet synchronous motor using counts of the A- and B-phase pulses subsequently counted in synchronism with the rotation of the rotor when a C-phase pulse is thereafter detected during rotation of the permanent-magnet synchronous motor, and thereafter outputting a magnetic pole reference detection completion signal, second current command generating means for outputting an alternating current command having a constant amplitude and a low frequency, current command switch means for switching between outputting the current command outputted from the first current command generating means and outputting the current command outputted from the second current command generating means, magnetic pole detection command generating means for starting said second current command generating means and switching said current command switch means to said second current command generating means in an initial stage before a normal operation command is given to the permanent-magnet synchronous motor after a power supply voltage is applied to the permanent-magnet synchronous motor, and switching said current command switch means to said first current command generating means when said magnetic pole reference detection completion signal is outputted, current detecting means for detecting a current outputted from said inverter to the permanent-magnet synchronous motor, and current control means for controlling a current of said inverter with the current command supplied from said current command switch means and a detected signal from said current detecting means.

6. An apparatus having a speed control loop and a current control loop, for controlling a permanent-magnet synchronous motor having a rotor having permanent magnets as magnetic poles for driving the rotor, and an angular position detector mounted on a rotatable shaft of the permanent-magnet synchronous motor and having an A- and B-phase pulse train generating means for generating a number of A- and B-phase pulses per rotation which have respective electrical angles that are 90° out of phase with each other and a C-phase pulse train generating means for generating a C-phase pulse per rotation, the angular position detector being assembled so as to output a C-phase pulse when a magnetic pole reference of the rotor reaches a predetermined angle of a stator, said apparatus comprising:

a main circuit and a control circuit;

said main circuit comprising a converter for converting an alternating current into a direct current and outputting the direct current, a smoothing capacitor for smoothing the direct current outputted from the converter, and an inverter for energizing the permanent-magnet synchronous motor;

said control circuit comprising speed detecting means for converting a signal from said angular position detector into a speed signal and outputting the speed signal, speed control means for controlling a speed of the permanent-magnet synchronous motor with said speed signal and a speed command, angle signal detecting means for generating an angular displacement signal for a current command which is produced using counts of the A- and B-phase pulses counted in synchronism with the rotation of the rotor with the position of a C-phase pulse from the angular position detector being used as a magnetic pole reference of the rotor when the C-phase pulse is outputted, angle command generating means for generating an angular displacement signal at a low frequency and a speed signal representing an angle change in each preset unit time of the angular displacement signal, angle command switch means for switching between outputting the angular displacement signal outputted from said angle signal detecting means and outputting the angular displacement signal outputted from said angle command generating means, speed command switch means for switching between outputting a speed command supplied to said apparatus and outputting a speed command outputted from said angle command generating means, magnetic pole reference detecting means for outputting a magnetic pole reference detection completion signal and outputting a reset signal to reset the angular displacement signal to zero to said angle signal detecting means when a C-phase pulse from said angular position detector is detected, magnetic pole detection command generating means for switching said angle command switch means and said speed command switch means to said angle command generating means in an initial stage before a normal operation command is given to the permanent-magnet synchronous motor after a power supply voltage is applied to the permanent-magnet synchronous motor, and switching said angle command switch means and said speed command switch means to said angle signal detecting means and the speed command supplied to said apparatus, respectively, when said magnetic pole reference detection completion signal is outputted, current command generating means for generating a current command from a current amplitude signal supplied from said speed control means and the angular displacement signal supplied from said angle command switch means, current detecting means for detecting a current outputted from said inverter to the permanent-magnet synchronous motor, and current control means for controlling a current of said inverter with the current command supplied from said current command generating means and a detected signal from said current detecting means.

\* \* \* \* \*